US 6,698,695 B1

(12) United States Patent
Spoto

(10) Patent No.: US 6,698,695 B1
(45) Date of Patent: Mar. 2, 2004

(54) CARGO HOOK

(75) Inventor: Louis M. Spoto, Huntley, IL (US)

(73) Assignee: Waveland Industries, Inc., Woodstock, IL (US)

( * ) Notice: Subject to any disclaimer, the term of this patent is extended or adjusted under 35 U.S.C. 154(b) by 0 days.

(21) Appl. No.: 09/374,188

(22) Filed: Aug. 13, 1999

(51) Int. Cl.[7] .............................................. B65B 67/12
(52) U.S. Cl. ........................ 248/95; 24/567; 248/205.3; 248/308
(58) Field of Search ................................ 248/95, 205.3, 248/316.7, 304, 914, 308; 224/567

(56) References Cited

U.S. PATENT DOCUMENTS

| 4,379,538 A | * | 4/1983 | Welles ........................... 248/95 |
| 4,466,659 A | * | 8/1984 | Carpentier et al. | |
| 4,836,602 A | * | 6/1989 | d'Almada Remedios et al. | |
| 5,246,190 A | * | 9/1993 | Swirkal ........................ 248/100 |
| 5,356,061 A | * | 10/1994 | Yu | |
| 5,415,457 A | * | 5/1995 | Kifer | |
| 5,492,257 A | * | 2/1996 | Demick | |
| 5,573,216 A | * | 11/1996 | Kuroda ....................... 248/316.7 |
| 5,639,051 A | * | 6/1997 | Surbeck ........................ 248/100 |
| 5,716,091 A | * | 2/1998 | Wieczorek | |
| 5,769,294 A | * | 6/1998 | Heinz et al. .................. 224/567 |
| 5,823,497 A | * | 10/1998 | Weatherhead ............. 248/316.7 |
| 5,829,725 A | * | 11/1998 | Russo .......................... 248/304 |
| 5,863,092 A | * | 1/1999 | Kifer ....................... 297/188.04 |

* cited by examiner

Primary Examiner—Ramon O. Ramirez
(74) Attorney, Agent, or Firm—Foley & Lardner

(57) ABSTRACT

A cargo hook (10) for organizing and securing bags within a motor vehicle. The cargo hook (10) includes a based (12) adapted for attachment to a motor vehicle surface. A flexible tab (14) extends from the base (12). An inner area (16) is formed between the flexible tab (14) and the motor vehicle surface. This inner area (16) is designed to receive bag handles.

24 Claims, 2 Drawing Sheets

CARGO HOOK

FIELD OF THE INVENTION

The present invention relates to organizing and securing cargo within a motor vehicle.

BACKGROUND OF THE INVENTION

Many retail stores and grocery stores typically package purchased items in plastic shopping bags. While these types of shopping bags are convenient because they conform to the shape of the items contained in the bags, they are difficult to transport in motor vehicles. The plastic bags, when they are set down, have a tendency to collapse around the items contained in the bags, exposing the contents of the bags and permitting the items to fall out and roll around in the cargo space of the motor vehicle.

Prior art devices have attempted to facilitate the transport of items packaged in plastic shopping bags in motor vehicles. One such prior art device involves the use of elastic netting material to restrain articles during transport. Hooks designed to secure plastic shopping bags within a vehicle storage area are also known in the art. However these prior art hooks tend to cause inadvertent snagging or injury to people. Those prior art hooks designed to minimize snagging are often composed of multiple pieces that are relatively expensive to manufacture. Many prior art hooks are composed of rigid, inflexible materials. When such hooks are subjected to excessive forces generated during sudden vehicle movements such as for example, stopping, turning, acceleration or deceleration, they are often susceptible to breaking. Another prior art device, a suction hook, tends to peel off the motor vehicle surface under excessive force conditions. In addition, the attachment of many prior art hooks to motor vehicle surfaces often requires complicated procedures, such as drilling of holes or spot welding.

Thus what is needed is a device for use in the cargo area of motor vehicles for organizing and securing plastic grocery or merchandise bags to minimize the spillover of the contents. The device should be designed to minimize the potential for snagging or injury to people. The device should have a relatively low manufacturing cost to be affordable to consumers. In addition, the device should be easily installable on a motor vehicle surface. Finally the device should be designed so that excessive forces generated during sudden vehicle movements such as for example, stopping, turning, accelerating or decelerating, do not cause the device to break or to peel off the motor vehicle surface.

SUMMARY OF THE INVENTION

The present invention provides a device for use in the cargo area of motor vehicles for organizing and securing plastic grocery or merchandise bags to minimize the spillover of the contents. Safety features minimizing snagging or injury to people are also incorporated into the present invention. In addition the present invention is relatively inexpensive to manufacture and is easily installable on a motor vehicle surface. Furthermore, the present invention is designed to ensure that excessive forces generated during sudden vehicle movements such as for example stopping, turning, accelerating or decelerating, do not cause the device to break or peel off the motor vehicle surface.

The present invention provides a cargo hook for organizing and securing bags within a motor vehicle. The cargo hook includes a base adapted for attachment to a motor vehicle surface. A tab extends from the base. An inner area is formed between the tab and the motor vehicle surface. This inner area is designed to receive bag handles.

The rear surface of the cargo hook base may have a generally planar construction. An adhesive layer may be provided on the rear surface for affixing the cargo hook to a motor vehicle surface. The front surface of the cargo hook may include a recess defined by a raised perimeter. The distal end of the flexible tab may be curved inwardly. The distal end may be adapted to be secured against the front surface of the base. The cargo hook may be manufactured using a pliable material. The pliable material may consist of soft rubber, EPDM, SBR or a flexible plastic. The cargo hook may be manufactured as a single piece. The cargo hook may be manufactured using a molding process.

DETAILED DESCRIPTION OF THE PREFERRED EMBODIMENT

Figure 1:
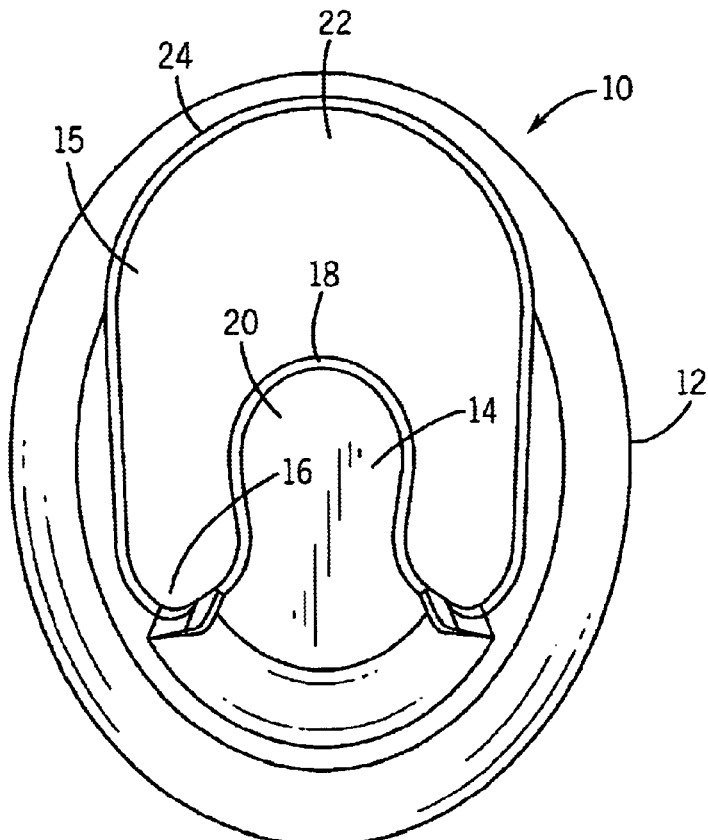
FIG. 1 is a front view of a preferred embodiment of a cargo hook made in accordance with the principles of the present invention.
Figure 2:
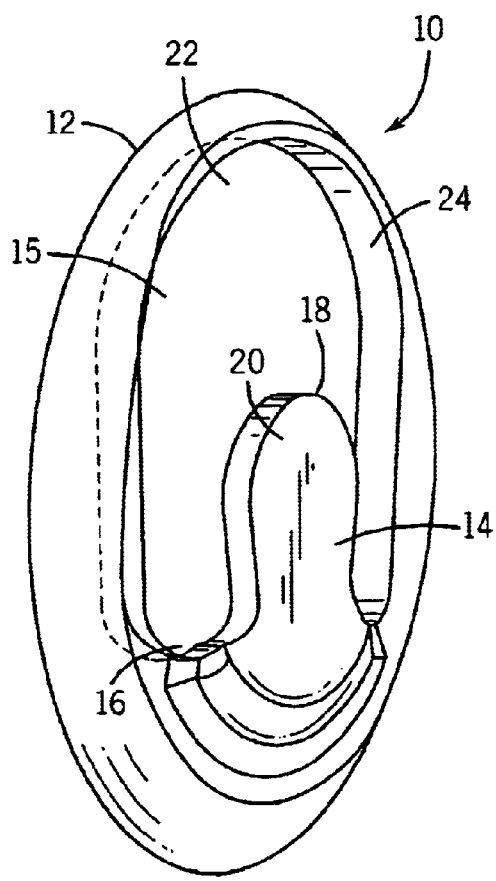
FIG. 2 is a perspective view of the cargo hook of FIG. 1.

FIG. 1 is an illustration of a preferred embodiment of a cargo hook 10 made in accordance with the principles of the present invention. FIG. 2 illustrates a perspective view of the cargo hook 10 of FIG. 1. The cargo hook 10 includes a base 12 that is adapted for attachment to a surface on a motor vehicle. A flexible tab 14 generally extends from the front surface 15 of the base 12. Referring to FIG. 2, an inner area 16 is formed between the flexible tab 14 and the base 12. This inner area 16 is designed to receive the handles of plastic grocery bags or merchandise bag handles.

In a preferred embodiment of the invention, the base 12 is generally oval shaped. A rear surface covers the entire area of the oval. An adhesive backing 13 is provided on the rear surface of the base 12. The adhesive backing 13 permits the attachment of the cargo hook 10 to a desired surface within the motor vehicle such as for example, to a wheel well surface in the cargo area of a minivan or a sport utility vehicle. The adhesive layer preferably covers the entire area of the rear surface, such that the load supported by the flexible tab 14 is distributed over a large area. In addition, the pliable composition of the cargo hook 10 enables the base 12 to conform to contoured surfaces such as, for example, the wheel well surface in the cargo area of a minivan or a sport utility vehicle, thereby providing maximum contact between the adhesive backing 13 and the vehicle surface. While an adhesive backing 13 is described as the preferred means of attachment of the cargo hook 10 to the motor vehicle surface, other methods of attachment are also considered to be within the scope of the invention.

The flexible tab 14 primarily performs the function of securing the plastic bags in place. The resilient nature of the flexible tab 14 facilitates the placement of the bag handles within the cargo hook 10. Additionally, the flexible tab 14 is specifically designed to attenuate the dynamic forces encountered by the cargo hook 10 when the motor vehicle is in motion, thereby reducing the resulting localized forces on the adhesive. The pliable composition of the flexible tab 14 enables the tab to bend with increasing load until a maximum threshold load is reached. At this threshold point, the bag simply slips out of the cargo hook 10 preventing the entire cargo hook 10 from peeling off the motor vehicle surface. Since the flexible tab 14 is not permanently deformed after encountering an overload condition, the cargo hook 10 can be used again to secure bags under normal load conditions.

Figure 3:
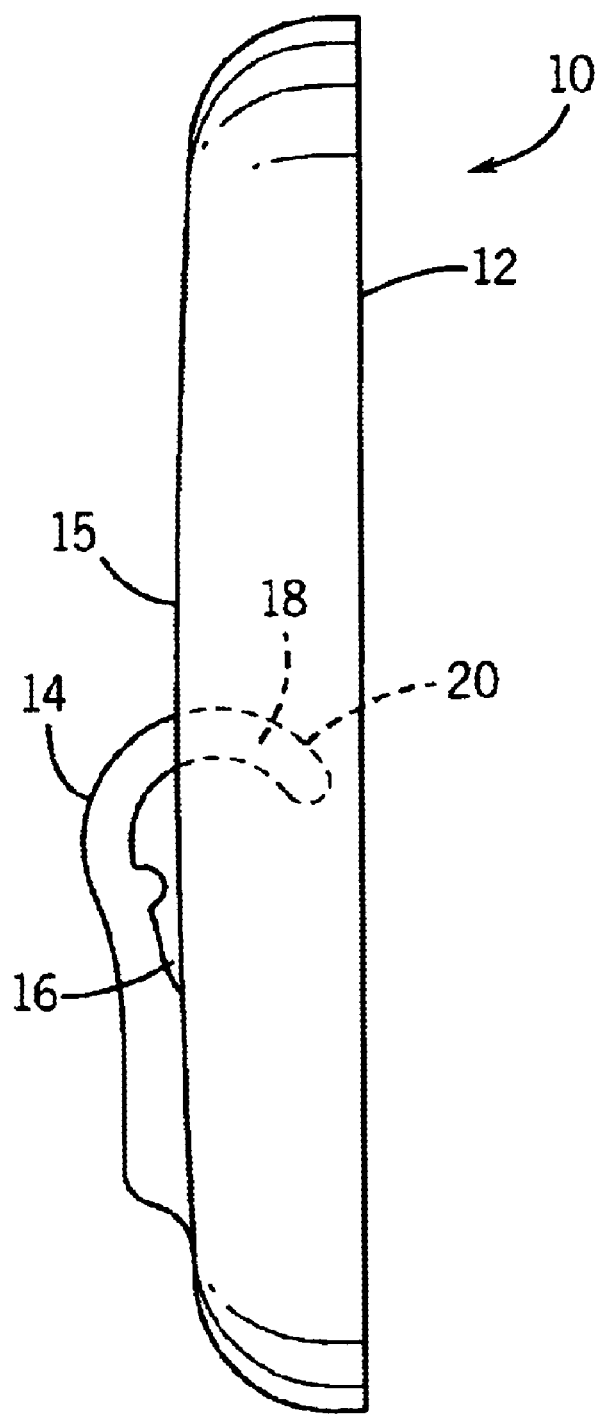
FIG. 3 is a view of the cargo hook in the secured position.

As shown in FIG. 3, in the preferred embodiment of the cargo hook 10, the flexible tab 14 can be used to secure a bag handle in place within the cargo hook 10. Once the bag handle has been placed within the inner area 16 of the cargo hook 10, the distal end 18 of the flexible tab 14 is curled over the bag handle towards the front surface 15 of the base 12 and the outer surface 20 of the distal end 18 of the flexible tab 14 is frictionally held in place against the front surface 15 of the base 12. Securing the bag handle within the cargo hook 10 in this manner prevents normal forces from causing the bag handle to slip out of the cargo hook 10 while at the same time permitting the bag handle to slip out of the cargo hook 10 under overload conditions.

The cargo hook 10 of the preferred embodiment has a relatively low profile construction. The front surface 15 of the base 12 has a center recess 22 that is defined by a raised perimeter 24. The flexible tab 14 extends outward and then upward from the raised perimeter 24 of the base 12. The low profile construction of the cargo hook 10 enables the flexible tab 14 to better support the forces generated by the bags with a minimum of moment arm thereby further reducing forces that could cause the cargo hook 10 to peel off the motor vehicle surface. Furthermore, the pliable composition of the cargo hook 10 in conjunction with the low profile construction of the flexible tab 14 helps minimize snagging and injury to persons coming in contact with the cargo hook 10.

The cargo hook 10 of the preferred embodiment consists of a single piece. The material used to manufacture the cargo hook 10 should be of a pliable or flexible nature so as to permit placement of the flexible tab 14 of the cargo hook 10 in the secured position and to enable the cargo hook 10 to snap back into shape after experiencing overload conditions. The material hardness should be at least about 30 Shore A to withstand anticipated load conditions. The preferred range of hardness is from about 50 Shore A to about 60 Shore A. Materials such as ethylene-propylene diene terpolymers ("EPDM"), styrene-butadiene rubbers ("SBR"), soft rubber or flexible plastics can be used to manufacture the preferred embodiment of the cargo hook 10. The cargo hook 10 can be manufactured using a simple molding process.

While the invention has been described with specific embodiments, other alternatives, modifications and variations will be apparent to those skilled in the art. Accordingly, it is intended to include all such alternatives, modifications and variations set forth within the spirit and scope of the appended claims.

What is claimed is:

1. A hook, comprising:
   a base having a rear surface adapted for attachment to a surface and a front surface;
   a flexible tab extending from the base and defining a distal end, the flexible tab defining an unsecured position wherein the distal end of the flexible tab extends upwardly from the base, the flexible tab further defining a secured position wherein the distal end is curled against the front surface of the base so that the distal end is frictionally secured against the front surface of the base; and
   an inner area formed between the flexible tab and the front surface of the base, the inner area adapted to receive a handle of a bag.

2. The hook of claim 1 wherein the distal end of the tab curves inwardly towards the front surface of the base.

3. The hook of claim 1 wherein the front surface of the base has a recess defined by a raised perimeter.

4. The hook of claim 1 wherein the cargo hook is made from a pliable material.

5. The hook of claim 4 wherein the pliable material consists of a soft rubber.

6. The hook of claim 4 wherein the pliable material consists of EPDM.

7. The hook of claim 4 wherein the pliable material consists of SBR.

8. The hook of claim 4 wherein the pliable material consists of a flexible plastic.

9. The hook of claim 1 wherein the hook is manufactured from a material having a hardness of about 50 Shore A to about 60 Shore A.

10. The hook of claim 1 wherein the hook is a single piece.

11. The hook of claim 1 wherein the hook is manufactured using a molding process.

12. The cargo hook of claim 1 wherein the rear surface of the cargo hook has a surface area sufficient to carry the load forces of a bag.

13. A cargo hook for organizing and securing bags within a vehicle, comprising:
   surface a base having a generally planar rear surface and a front surface, the front surface of the base having a recess defined by a raised perimeter;
   a tab extending from the base; and
   an inner area formed between the tab and the base, the inner area adapted to receive a handle of a bag.

14. The cargo hook of claim 13 wherein the tab includes a distal end that curves inwardly towards a front surface of the base.

15. The hook of claim 13 wherein an adhesive layer is provided on the rear surface for affixing the base to a contoured surface.

16. The cargo hook of claim 13 wherein the cargo hook is made from a pliable material.

17. The cargo hook of claim 16 wherein the pliable material consists of a soft rubber.

18. The cargo hook of claim 16 wherein the pliable material consists of EPDM.

19. The cargo hook of claim 16 wherein the pliable material consists of SBR.

20. The cargo hook of claim 16 wherein the pliable material consists of a flexible plastic.

21. The cargo hook of claim 13 wherein the cargo hook is manufactured from a material having a hardness of from about 50 Shore A to about 60 Shore A.

22. The cargo hook of claim 13 wherein the cargo hook is a single piece.

23. The cargo hook of claim 13 wherein the cargo hook is manufactured using a molding process.

24. The cargo hook of claim 13 wherein the rear surface of the cargo hook has a surface area sufficient to carry the load forces of the bag.

* * * * *